(12) United States Patent
Sahar

(10) Patent No.: US 10,474,258 B2
(45) Date of Patent: Nov. 12, 2019

(54) ACTIVE STYLUS

(71) Applicant: Microsoft Technology Licensing, LLC, Redmond, WA (US)

(72) Inventor: Ran Sahar, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/179,868

(22) Filed: Nov. 2, 2018

(65) Prior Publication Data
US 2019/0073049 A1 Mar. 7, 2019

Related U.S. Application Data

(63) Continuation of application No. 15/666,625, filed on Aug. 2, 2017, now Pat. No. 10,198,094.

(51) Int. Cl.
*G06F 3/0354* (2013.01)
*G06F 3/038* (2013.01)

(52) U.S. Cl.
CPC ........ *G06F 3/0383* (2013.01); *G06F 3/03545* (2013.01)

(58) Field of Classification Search
CPC .................. G06F 3/03545; G06F 3/0383
USPC .................. 178/18.01–19.07; 345/179
See application file for complete search history.

(56) References Cited

U.S. PATENT DOCUMENTS

| 8,643,220 B1* | 2/2014 | Bhosale | H03K 17/725 307/115 |
| 2002/0044112 A1* | 4/2002 | Gross | G02C 7/101 345/87 |
| 2005/0127893 A1* | 6/2005 | Matsubara | G06F 3/03545 324/76.67 |
| 2012/0265196 A1* | 10/2012 | Turner | A61B 17/320092 606/34 |

FOREIGN PATENT DOCUMENTS

| EP | 1538516 A2 * | 6/2005 | ......... G06F 3/03545 |
| WO | WO-2013158537 A2 * | 10/2013 | ..... A61B 17/320068 |

* cited by examiner

*Primary Examiner* — Michael Pervan

(57) ABSTRACT

Apparatus for determining user operation of an actuator, based on determining a time constant of a state circuit coupled to the actuator.

20 Claims, 3 Drawing Sheets

ACTIVE STYLUS

PRIORITY INFORMATION

This application is a continuation application of and claims priority to U.S. patent application Ser. No. 15/666,625, entitled "ACTIVE STYLUS," filed on Aug. 2, 2017, the disclosure of which is incorporated herein by reference in its entirety.

BACKGROUND

Touchscreens, which are ubiquitous components of smart phones and tablets are fast becoming ever more popular, if not necessary, user interfaces for a rapidly increasing selection of computing and communication devices as the touchscreens become less expensive to manufacture in ever larger sizes. Today they may be found by way of example, in a variety of sizes as interfaces for laptops, desktops, plant control systems, and are replacing whiteboards and large video screens as presentation displays in meeting and conference rooms.

As its name implies, a user interacts with a touchscreen by touching the screen with a fingertip or tip of a passive or active stylus. The touchscreen may sense a location of the fingertip or stylus tip on the touchscreen by inductively or capacitively coupling to the tip and transmit signals indicating the location to a computer coupled to the touchscreen. The computer may operate to associate the location of the tip with a location of a feature that the computer displays on the touchscreen to determine how to respond to the user.

A passive stylus mimics a finger and typically comprises an electrically conductive rod having a tip of a size similar to that of a fingertip. It does not actively transmit signals of its own or process signals generated by a touchscreen, and therefore does not need and does not comprise or have access to a power source. As a result, resolution of location of a passive stylus tip on a touchscreen is generally relatively coarse, and a passive stylus may be constrained by relatively coarse spatial interaction with a touchscreen. An active stylus on the other hand comprises or has access to its own power source and may be configured to transmit signals to a touchscreen as well as to receive and process signals from the touchscreen. The tip of an active stylus may be small in comparison to a fingertip and is typically locatable on a touchscreen with fine spatial resolution that enables fine line drawing and detail selection of features on the touchscreen that are not readily supported by passive stylus. In addition, an active stylus may offer advantageous functions such a pressure sensing that are generally not available from a passive stylus. The stylus typically comprises at least one state actuator manually operable by a user, for example by pressing on a button and/or moving a slider that the stylus comprises, to control stylus functions.

SUMMARY

An aspect of an embodiment of the disclosure relates to providing an active stylus comprising a battery and an energy conservative controller configured to determine whether a user has operated a control button of the stylus to arouse the stylus from a dormant state to an active state. The dormant and active states of the stylus are states respectively characterized by relatively low and relatively enhanced consumption of battery energy. The dormant, low energy state may be a state in which a user is not actively operating the stylus to interface with a touch screen. The active state may be a state in which the user is actively using the stylus to interface with a touch screen.

In an embodiment, the controller may comprise a popup and test (POPAT) circuit coupled to a state circuit having a characteristic state time constant the magnitude of which may be changed by user operation of a state actuator that the stylus comprises. In a dormant state of the stylus, the time constant of the state circuit may have a first "dormant magnitude". A user may operate the state actuator to change the time constant to a second "active magnitude" to transition the stylus from the dormant state to an active state. POPAT is operable to repeatedly, optionally periodically, awake and "pop-up", to test and acquire data that may be used to determine the time constant of the state circuit, and thereby whether a user has operated the state actuator to change the state of the stylus from dormant to active. In the event that data that POPAT acquires indicates that a user has operated the state actuator to turn on the stylus, the controller may configure the stylus for active operation and enhanced consumption of battery energy that may be required to power stylus functionalities in the active state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1A:
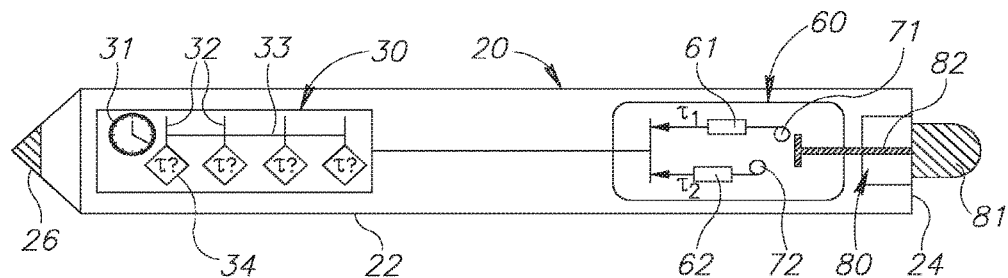
FIGS. 1A-1C schematically show a schematic block diagram of a stylus comprising a POPAT, state circuit, and state actuator, in different respective states of operation, in accordance with an embodiment of the disclosure.
Figure 1B:
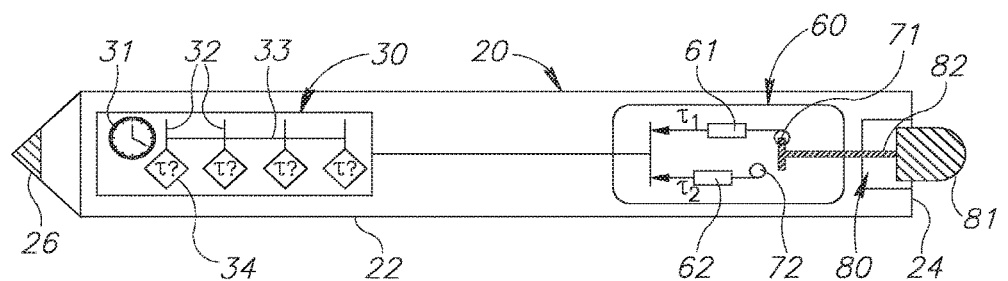
Figure 1C:
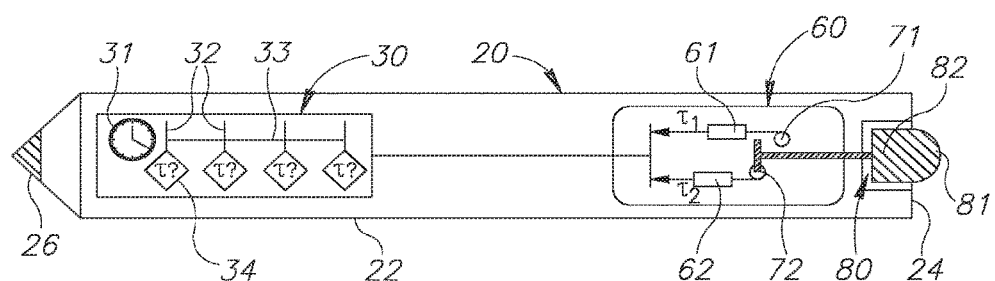

In the detailed discussion below logical structure and operation of an active stylus in accordance with an embodiment of the disclosure are discussed with reference to FIGS. 1A-1C. A schematic diagram of exemplary POPAT and state circuits that may be used to provide functionalities of the active stylus shown in FIGS. 1A-1C is illustrated and discussed with reference to FIG. 2. A time line of operational actions that the POPAT shown in FIG. 2 performs during testing of the state circuit by the POPAT circuit is discussed with reference to FIG. 3.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

FIG. 1A shows a very schematic illustration of an active stylus 20 comprising a body 22 housing a stylus controller (not shown) comprising or having access to a POPAT circuit 30 coupled to a state circuit 60, in accordance with an embodiment of the disclosure. State circuit 60 has a plurality of different states optionally characterized by different respective time constants. The different states of state circuit 60 correspond to different operational states of the stylus, which states may for example comprise at least one dormant state of the stylus, and at least one active state of the stylus. A state actuator 80 is coupled to state circuit 60, and optionally comprises a push-button 81 at an eraser end 24 of stylus 20. The push-button may be depressed to change the time constant of the state circuit and thereby a state of the stylus. Stylus body 22 has a stylus tip 26 configured to provide coupling, which may be at least one or any combination of more than one of resistive, inductive, or capacitive coupling, of the stylus to a touchscreen. Optionally, stylus tip 26 is a pressure sensitive tip that may generate signals responsive to pressure with which a user presses the stylus tip to a touchscreen. In an active state stylus 20 may process the signals generated by the stylus tip 26 to transmit data to the touchscreen. For example, as the user increases contact pressure between pressure sensitive tip 26 and the touch screen, stylus 20 may transmit data responsive to the pressure to the touch screen that causes the touchscreen to increase width of a line that the user draws on the touch screen with the stylus.

By way of example, in FIGS. 1A-1C state circuit 60 is schematically indicated as having two time constants $\tau_1$ and $\tau_2$ determined by devices, hereinafter also referred to as time constant set devices, represented by rectangles 61 and 62 respectively connected to contact pads 71 and 72. State actuator 80 has a contact plunger 82 connected to pushbutton 81 configured to interact with the contact pads when the push-button is depressed. Contact plunger 82 may be operable to selectively make contact with contact pad 71 or contact pad 72 by pushing on push-button 81 to depress the push-button to different corresponding depths into eraser end 24. Making contact with a contact pad 71 or 72 sets the state time constant for state circuit 60 to the time constant $\tau_1$ and $\tau_2$ respectively associated with the contact pad.

For example, FIG. 1A schematically shows push-button 81 not depressed and contact plunger 82 not making contact with either contact pad 71 or contact pad 72. When contact plunger is disconnected from both contact pads 71 and 72 state circuit 80 may exhibit a default, optionally a dormant state time constant "$\tau_0$". FIG. 1B schematically shows push-button 81 depressed by an amount that brings contact plunger 82 into contact with contact pad 71 associated with device 61 and time constant $\tau_1$ so that the state circuit 60 exhibits time constant $\tau_1$ when POPAT 30 operates to determine the time constant. FIG. 1C schematically shows push-button 81 depressed by an amount that brings contact plunger 82 into contact with contact pad 72 associated with device 62 and time constant $\tau_2$ so that state circuit 60 exhibits time constant $\tau_2$ when POPAT 30 operates to determine the time constant.

POPAT 30 may operate, or may be operated by the stylus controller, to repeatedly, optionally periodically, access state circuit 60 to determine the state circuit's time constant "$\tau$", In FIGS. 1A-1C POPAT 30 is schematically shown operating responsive to periodic clock signals provided by a suitable clock 31 and represented by witness lines 32 along a time line 33. Optionally, each clock signal 32 initiates a process indicated by a diamond icon 34 that POPAT 30 performs to determine a value for the state time constant $\tau$ characterizing state circuit 60 substantially at a time of the clock signal.

It is noted that FIGS. 1A-1C illustrate logical components of a POPAT, state circuit, and state actuator, comprised in an active stylus, their respective functionalities, and their interaction, in accordance with an embodiment of the disclosure. The functionalities may be executed by any of various electronic, optical, and/or mechanical components and/or systems or combinations of such components and systems. The components and/or systems and may be parts of a same unit within stylus 20 or distributed at different locations within the stylus. For example, clocks, counters, and/or processors that support and/or control functionalities of POPAT 30 may be comprised in a same unit, such as an ASIC (application specific integrated circuit) or an SoC (system on a chip) within stylus 20 or be distributed among different units within the stylus, and/or be accessible to POPAT 30 as may be required for operation of POPAT. By way of example, FIG. 2 schematically shows examples of electronic POPAT and state circuits 30 and 60 respectively that an active stylus may comprise to provide functionalities of the stylus, in accordance with an embodiment of the disclosure.

Figure 2:
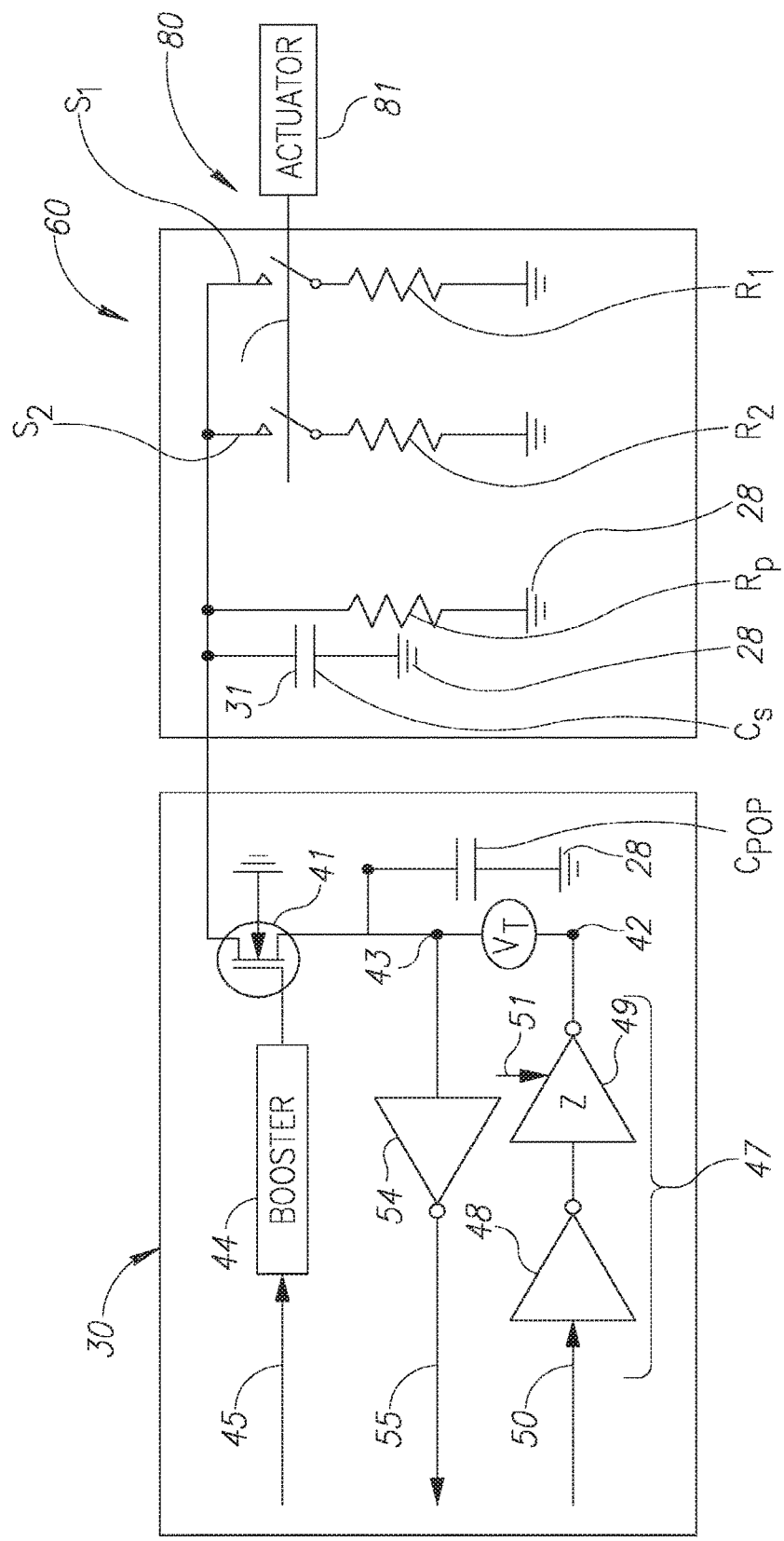
FIG. 2 schematically shows details of exemplary POPAT and state circuits operable to implement the operational states shown in FIGS. 1A-1B, in accordance with an embodiment of the disclosure.

As schematically shown in FIG. 2 state circuit 60 may be configured to be characterized by three resistor-capacitor (RC) time constants, $\tau_0$, $\tau_1$, and $\tau_2$, optionally provided by a single capacitor and three resistances, and comprises a state capacitor $C_S$ permanently connected to a ground 28 by a parasitic resistance $R_p$. State circuit 60 also comprises, optionally two, state resistors $R_1$ and $R_2$ that may selectively be connected in parallel with state capacitor $C_S$ to ground by operation of a state actuator 80. State actuator 80 optionally comprises a push-button 81 located at eraser end 24 (FIGS. 1A-1C) of stylus 20 coupled to a plunger 82 connected to switches $S_1$ and $S_2$. Switches $S_1$ and $S_2$ and plunger 82 are optionally configured so that when push-button 81 is not depressed, both switches $S_1$ and $S_2$ are open and state resistors $R_1$ and $R_2$ are not connected to capacitor $C_S$. The switches and plunger are also optionally configured so that a deep depression of push-button 81 into eraser end 24 closes switch $S_1$ and connects resistor $R_1$ in parallel with state capacitor $C_S$, and a shallow depression of the push-button closes switch $S_2$ to connect resistor $R_2$ in parallel with state capacitor $C_S$. When both switches $S_1$ and $S_2$ are open, state circuit 60 is characterized by a time constant $\tau_0 = (R_P C_S)$. When switch $S_1$ is closed state circuit 60 is characterized by a time constant $\tau_1 = (R_P R_1 C_S)/(R_P + R_1)$, and when switch $S_2$ is closed, the state circuit is characterized by a time constant $\tau_2 = (R_P R_2 C_S)/(R_P + R_2)$. Optionally push-button 81 is spring loaded so that after a user pushes on push-button 81 to depress the push-button, upon release, the push-button reverts to an undepressed state in which switches S1 and S2 are open.

In an embodiment stylus 20 may be configured to transition from a dormant state to an active state if data POPAT 30 acquires for the time constant of state circuit 60 determines that the time constant of state circuit 60 is equal to about $\tau_1$. Optionally, following transition to the active state, stylus 20 may operate to transition between different functionalities each time POPAT 30 acquires data indicating that push-button 81 has been pushed to connect resistor $R_2$ in parallel with capacitor $C_S$ and set the time constant of state circuit 60 to $\tau_2$. Optionally, stylus 20 is configured to revert to the dormant state if the stylus is not in use for a period of time greater than a threshold inactivity time $T_I$.

POPAT 30 is optionally configured to charge capacitor $C_S$ comprised in state circuit 60 to a test voltage $V_T$ and then acquire data that may be used to determine a time constant with which the capacitor discharges to determine a time constant $\tau$ of state circuit 60. Optionally, POPAT 30 operates to acquire data that indicates how long it takes for voltage across capacitor $C_S$ to decrease from $V_T$ to a relaxation voltage $V_R$ to determine the time constant $\tau$.

In an embodiment to carry out the determination of the time constant $\tau$ of state circuit 60, POPAT 30 may comprise an optionally high voltage NMOS transistor 41 that may be turned on by a suitable gate voltage to connect a capacitor $C_{POP}$, a charging node 42, and a sensing node 43 to capacitor $C_S$ of state circuit 60. A booster 44 is connected to transistor 41 and generates the gate voltage $V_G$ responsive to a booster input voltage $V_B$ received at an input represented by an arrow 45 of the booster. Charging node 42 is connected to a charger 47 optionally comprising an inverter 48 connected in series with a tristate inverter 49. Inverter 48 has an input represented by an arrow 50 and tristate inverter 49 has a control input represented by an arrow 51. Charger 47 provides a current that charges capacitors $C_{POP}$ and $C_S$ to a voltage $V_T$ when NMOS transistor 41 is turned ON by a gate voltage from booster 44 and input 50 of inverter 48 and tristate inverter control input 51 receive a logical 1 signals. When tristate inverter control input 51 receives a logical 0 the output impedance of tristate inverter 49 goes high (conventionally referred to as HiZ) to substantially disconnect charger 47 from charging node 42. A sensing inverter 54 connected to sensing node 43 generates logical output signals at an output, represented by an arrow 55, of the inverter responsive to voltage at the sensing node. In an embodiment, sensing inverter 54 generates a logical 1 voltage, $VS_H$, at output 55 when voltage at sensing node 43 is less than relaxation voltage $V_R$ and a logical 0 voltage, $VS_L$, when voltage at sensing node 43 is above relaxation voltage $V_R$.

It is assumed that a controller, (not shown) that comprises or has access to POPAT 30 generates input signals at inputs 45, 50, and 51 that control operation of POPAT 30, and receives and processes output signals that sensing inverter 54 generates at output 55 responsive to voltage at node 43 to determine time constant $\tau$ that characterizes state circuit 60. The controller is assumed to comprise clock 31 shown in FIGS. 1A-1C and to, optionally periodically, initiate determining the time constant $\tau$ at times when clock signals 32 (FIGS. 1A-1C) occur.

Figure 3:
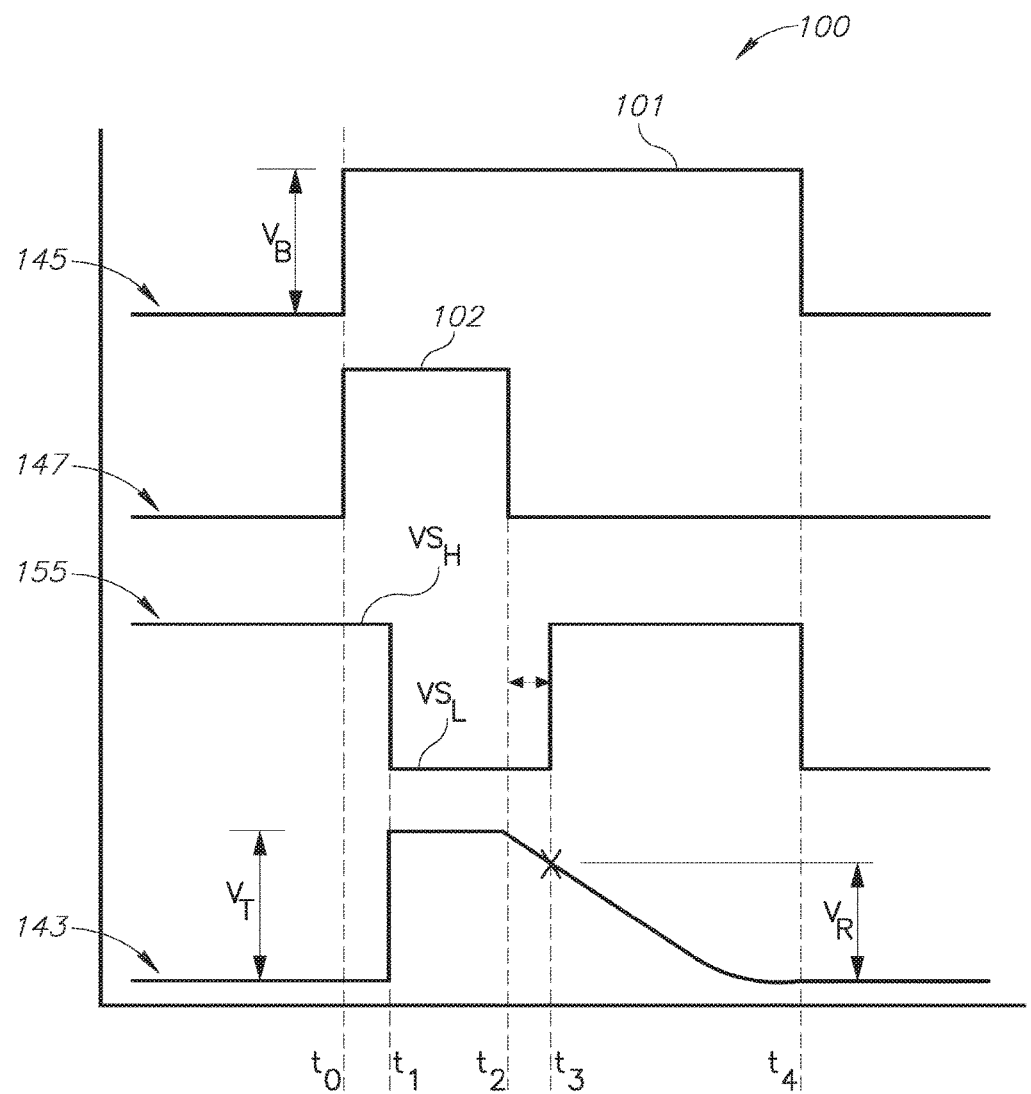
FIG. 3 shows a schematic timing diagram illustrating a sequence of events performed by elements of the POPAT circuit shown in FIG. 2 to determine a time constant of the status circuit shown in FIG. 2, in accordance with an embodiment of the disclosure.

A sequence of events that the controller optionally orchestrates to control POPAT 30 upon initiating determining time constant $\tau$ at an arbitrary time $t_0$ at which a clock signal 32 occurs is described with reference to a time line graph 100 having timelines 145, 147, 155, and 143 shown in FIG. 3.

Time lines 145 and 147 schematically show input signals as a function of time respectively at input 45 of booster 44, and at inputs 150 and 151 of inverter 50 and tristate inverter 151 comprised in charger 47. Time line 155 schematically shows signal voltage that sensing inverter 54 generates at output 55 responsive to voltage, shown along timeline 143 at sensing node 43 (FIG. 2) as a function of time.

At time $t_0$ the controller generates a booster input signal 101 of magnitude $V_B$ at booster input 45 that causes the booster to turn ON transistor 41 and connect nodes 42 and 43 to capacitor $C_S$. Optionally at time $t_0$ the controller also generates a logical 1 input signal 102 at inputs 50 and 51 of charger 47 to causes charger 47 to initiate charging capacitors $C_{POP}$ and $C_S$ to test voltage $V_T$. As schematically shown along time line 143, voltage across capacitors $C_{POP}$ and $C_S$, and thereby voltage at sensing node 43, reaches $V_T$ substantially at a time $t_1$. In response to charging of capacitors $C_{POP}$ and $C_S$, output voltage provided by sensing inverter 54 at output 55 decreases from voltage $VS_H$, at time $t_0$ to voltage $VS_L$, at time $t_1$.

At a time $t_2$ the controller ends logical 1 input signal 102 to charger 47 to set thereby the signal at control input 51 of tristate inverter 49 to logical 0. Setting the logical input to tristate inverter to logical 0 causes the output of the tristate converter to go to HiZ and substantially disconnect node 42 and thereby charger 47 from capacitors $C_{POP}$ and $C_S$. Disconnecting charger 47 from capacitors $C_{POP}$ and $C_S$ initiates discharging of the capacitors and relaxation of voltage across the capacitors to zero.

At time $t_2$ the controller also turns on a counter (not shown) to provide a number of counts between time $t_2$ and a time $t_3$ at which sensing inverter 54 changes the voltage signal at its output 55 from $VS_L$ back to voltage $VS_H$, when voltage across capacitors $C_{POP}$ and $C_S$, and thereby voltage at node 43, decreases below relaxation voltage $V_R$. The controller uses the elapsed time between $t_2$ and $t_3$ to determine a time constant for state circuit 60, and whether a user has pushed push-button 81 to connect resistor $R_1$ or resistor $R_2$ in parallel with capacitor $C_S$ of the state circuit. At a time $t_4$ the controller reduces voltage $V_B$ to zero and disconnects POPAT 30 from state circuit 60 until the controller receives another clock signal 32.

By way of a numerical example, in an embodiment clock 31 may operate at a frequency of 32 kHz, signals 32 (FIG. 1A-1C) may be periodic with a period of 1 s (second) and booster signal 101 (FIG. 3) may have a duration of about 1 ms (millisecond). The booster signal may have in input voltage $V_B$ of about 1.8 volts and an output gate voltage $V_G$ equal to about 3.0 volts. Logical input signal 102 to charger 47 may have a duration of about 300 ns (nanoseconds). Test voltage $V_T$ provided by charger 47 may have a magnitude of about 2 volts and relaxation voltage $V_R$ a magnitude of about 1 volt. Resistors $R_1$, $R_2$, and $R_P$ may have respective values equal to about 1 MΩ (megaohm), 4 MΩ, and greater than 5 MΩ. Capacitor $C_S$ may have a value between about 20 pF (picofarad) and about 30 pF and capacitor $C_{POP}$ may have a value equal to about 20 pF. A POPAT and state circuit configured as schematically shown in FIG. 2 and having numerical specifications noted above operates at a relatively very low power consumption and may draw an average current of about 50 nA (nanoamps) and operate at a power consumption of about 100 nW (nanowatts). As a result active stylus 20 may advantageously be packaged with an internal battery In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. An apparatus, comprising:
    a state circuit having a first capacitor experiencing a characteristic time constant that may assume a plurality of different magnitudes;
    an actuator operable by a user to change the magnitude of the characteristic time constant from a first to a second magnitude of the plurality of magnitudes; and
    a popup and test (POPAT) circuit comprising a second capacitor operable to access the state circuit to acquire data useable to determine whether a user has operated the actuator to change the magnitude of the characteristic time constant.

2. The apparatus according to claim 1 wherein the state circuit comprises for each of the plurality of magnitudes a resistor having resistance R and the first capacitor having capacitance C that determines the magnitude of the characteristic time constant as a resistance-capacitance (RC) time constant.

3. The apparatus according to claim 2 wherein for each of the different RC time constants, capacitance C is the same and resistance R is different.

4. The apparatus according to claim 2 wherein the POPAT circuit comprises a charger operable to charge the first capacitor to a test voltage $V_T$ to determine the magnitude of the characteristic time constant.

5. The apparatus according to claim 4 wherein the POPAT circuit comprises a first switch configured to receive a signal that operates to connect the charger to the first capacitor.

6. The apparatus according to claim 5 wherein the charger comprises a second switch configured to receive a signal that operates to disconnect the charger from the first capacitor and initiate at a first time discharge of the first capacitor and relaxation of voltage $V_T$.

7. The apparatus according to claim 6 wherein the second switch comprises a tristate inverter having a control input configured to receive the signal that operates to disconnect the charger from the first capacitor.

8. The apparatus according to claim 6 wherein the POPAT circuit comprises a sensor that includes the second capacitor and that generates output signals based on voltage across the first capacitor as the voltage relaxes from $V_T$.

9. The apparatus according to claim 8 wherein the sensor comprises an inverter that generates the output signals.

10. The apparatus according to claim 8 and comprising a controller that receives the output signals generated by the sensor and processes the signals to determine a second time at which the voltage across the capacitor decreases to a voltage less than a relaxation voltage $V_R$.

11. The apparatus according to claim 10 wherein the controller is configured to determine the magnitude of the characteristic time constant of the state circuit based on the output signals and the second time minus the first time.

12. The apparatus according to claim 10 wherein the controller controls the POPAT circuit to repeatedly or periodically access the state circuit to acquire the data.

13. The apparatus according to claim 12 wherein the period of the periodic access is less than or equal to about 1 second.

14. The apparatus according to claim 1 wherein the actuator comprises a push-button that is pushable to different displacements to change the magnitude of the characteristic time constant between different pairs of first and second magnitudes.

15. An active stylus having different states and comprising apparatus according to claim 1 wherein change of the magnitude from a first magnitude to a second magnitude operates to change a state of operation of the stylus.

16. A method of determining user operation of an actuator, the method comprising:
    connecting the actuator to a state circuit having a first capacitor with a characteristic time constant that may assume each of a plurality of different magnitudes so that operation of the actuator operates to change the magnitude of the time constant from a first to a second magnitude of the plurality of magnitudes; and
    operating a popup and test (POPAT) circuit comprising a second capacitor to determine the magnitude of the characteristic time constant from the first capacitor in the state circuit.

17. The method according to claim 16 wherein the time constant is a resistance-capacitance (RC) time constant determined by a resistance R and a capacitance C.

18. The method according to claim 17 wherein changing the magnitude of the time constant comprises changing the resistance R.

19. The method according to claim 16 and comprising changing a state of operation of an active stylus based on determining the magnitude.

20. A stylus comprising a stylus body and an actuator, the actuator enabling activation a plurality of switches within the stylus body to generate different magnitudes of voltages for a first capacitor, the stylus comprising:
    a state circuit embodying the first capacitor that is configured to experience a characteristic time constant that may assume a plurality of different magnitudes based on said activation of the plurality of switches via the actuator; and
    a popup and test (POPAT) circuit comprising a second capacitor operable to access the state circuit to acquire data useable to determine whether a user has operated the actuator to change the magnitude of the characteristic time constant.

* * * * *